(12) United States Patent
Fiegl

(10) Patent No.: US 11,046,034 B2
(45) Date of Patent: Jun. 29, 2021

(54) MANUFACTURING A FIBER-REINFORCED COMPOSITE COMPONENT USING MANDRELS

(71) Applicant: Rohr, Inc., Chula Vista, CA (US)

(72) Inventor: Michael S. Fiegl, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 343 days.

(21) Appl. No.: 15/131,852

(22) Filed: Apr. 18, 2016

(65) Prior Publication Data
US 2017/0297279 A1  Oct. 19, 2017

(51) Int. Cl.
*B29C 70/54* (2006.01)
*B29C 33/30* (2006.01)
*B29C 33/12* (2006.01)
*B29C 70/48* (2006.01)
*B29K 105/08* (2006.01)

(52) U.S. Cl.
CPC .......... *B29C 70/543* (2013.01); *B29C 33/12* (2013.01); *B29C 33/123* (2013.01); *B29C 33/126* (2013.01); *B29C 33/304* (2013.01); *B29C 70/48* (2013.01); *B29K 2105/0872* (2013.01)

(58) Field of Classification Search
CPC ....... B29C 70/543; B29C 33/12; B29C 70/30; B29C 70/541; B29C 70/38; B29C 70/48; B29C 33/126; B29C 33/303; B29C 33/304; B29C 33/123; B29C 33/14
See application file for complete search history.

(56) References Cited

U.S. PATENT DOCUMENTS

| | | | |
|---|---|---|---|
| 4,199,313 A * | 4/1980 | Bohnenberger | B22C 21/10 164/385 |
| 4,386,868 A * | 6/1983 | Bluver | B22C 21/10 164/387 |
| 4,460,325 A * | 7/1984 | Hori | B29C 33/48 264/276 |
| 5,482,340 A * | 1/1996 | Jensen | B25J 15/0052 294/81.51 |
| 5,693,166 A | 12/1997 | Crane | |
| 5,806,302 A | 9/1998 | Cariola et al. | |
| 5,902,535 A | 5/1999 | Burgess et al. | |
| 6,170,254 B1 | 1/2001 | Cariola | |
| 6,179,249 B1 | 1/2001 | Canadas | |
| 6,340,135 B1 | 1/2002 | Barton | |
| 6,561,478 B2 | 5/2003 | Cundiff et al. | |

(Continued)

*Primary Examiner* — Timothy Kennedy
*Assistant Examiner* — Sonny V Nguyen
(74) *Attorney, Agent, or Firm* — Getz Balich LLC

(57) ABSTRACT

A method includes disposing fibrous material with a first mandrel, a second mandrel and a first mold section, the first mandrel including a first base, the second mandrel including a second base, and the first mold section including a support surface; arranging the first base on the support surface; arranging the second base on the support surface adjacent a first side of the first base, the arranging including moving the second base along a first trajectory that is substantially coincident with a corner between the first side of the first base and the support surface; arranging a second mold section with the first mold section to provide a mold, where the first mandrel and the second mandrel are between the first and the second mold sections; injecting resin into the mold to engage the fibrous material; and curing the resin to form a composite component.

20 Claims, 15 Drawing Sheets

(56) References Cited

U.S. PATENT DOCUMENTS

| | | |
|---|---|---|
| 6,604,355 B1 | 8/2003 | Sternberger |
| 7,484,356 B1 | 2/2009 | Lair |
| 7,963,039 B2 | 6/2011 | Burnett et al. |
| 8,181,905 B2 | 5/2012 | McDonough et al. |
| 8,236,222 B2 | 8/2012 | Henderson et al. |
| 8,469,309 B2 | 6/2013 | Stuart et al. |
| 8,740,137 B2 | 6/2014 | Vauchel et al. |
| 8,876,042 B2 | 11/2014 | LaChapelle et al. |
| 8,919,668 B2 | 12/2014 | Vauchel et al. |
| 9,003,810 B2 | 4/2015 | Porte et al. |
| 9,021,848 B2 | 5/2015 | Leacock et al. |
| 9,188,026 B2 | 11/2015 | Calder et al. |
| 9,228,532 B2 | 1/2016 | Aten et al. |
| 2006/0011294 A1* | 1/2006 | Rajabali ................ B29C 70/088 156/307.7 |
| 2010/0000667 A1* | 1/2010 | Funnell ................ B29C 33/306 156/189 |
| 2011/0121487 A1* | 5/2011 | Topping ................ B29C 70/48 264/258 |
| 2011/0254185 A1* | 10/2011 | Liew .................... B29C 33/306 264/40.5 |
| 2012/0006470 A1* | 1/2012 | Lew ........................ B60B 5/02 156/193 |
| 2013/0115429 A1* | 5/2013 | Valle ..................... B29C 70/30 428/172 |
| 2013/0220435 A1 | 8/2013 | James |
| 2015/0107222 A1 | 4/2015 | Aten |
| 2015/0110613 A1 | 4/2015 | Aten |
| 2015/0267643 A1 | 9/2015 | Gonidec et al. |
| 2015/0285144 A1 | 10/2015 | Todorovic et al. |
| 2015/0308376 A1 | 10/2015 | James |
| 2015/0308378 A1 | 10/2015 | Aten |
| 2015/0328845 A1* | 11/2015 | Lockett ................ B29C 70/443 428/116 |
| 2017/0050342 A1* | 2/2017 | Hodde .................. B29C 70/541 |

\* cited by examiner

MANUFACTURING A FIBER-REINFORCED COMPOSITE COMPONENT USING MANDRELS

BACKGROUND OF THE INVENTION

1. Technical Field

This disclosure relates generally to manufacturing a fiber-reinforced composite component and, more particularly, to manufacturing a fiber-reinforced composite component using a set of mandrels.

2. Background Information

Various types of manufacturing techniques are known in the art for constructing a fiber-reinforced composite component. For example, a resin pressure molding (RPM) technique referred to as Same Qualified Resin Transfer Molding (SQRTM) was developed by Radius Engineering, Inc. and combines prepreg processing and liquid molding. The SQRTM technique involves laying up a part using prepreg composite material, and then inserting the layup into a sealed, closed die tool (or building up the closed die around the layup). The sealed tool is then subjected to heat to cure the prepreg. At the same time, additional liquid resin is injected into the die into any unfilled cavities and around the edges of the part to provide balanced, hydrostatic pressure throughout the tool to avoid the resin in the prepreg from flowing out into any unfilled cavities.

The SQRTM technique may commonly make use one or more mandrels within a mold cavity to define negative spaces (i.e., cavities) within the composite component and to form internal, integral, co-cured support structures such as spars or ribs. During layup of the prepreg and assembly of the mandrels with the other tool parts, the mandrels may need to be arranged carefully so as to prevent rubbing against any adjacent prepreg material that has already been laid up. Rubbing of the prepreg material may damage and/or otherwise disrupt the prepreg material and cause defects in the molded composite component. This can be a very difficult task in the manufacture of a large composite part where the mandrels are similarly large in size, unwieldy, and not easily manipulated by hand. There is a need for a way to manipulate mandrels during a SQRTM layup and tool assembly process to help ensure against prepreg rubbing. The following invention addresses this need.

SUMMARY OF THE DISCLOSURE

According to an aspect of the present disclosure, a method is provided for manufacturing a fiber-reinforced composite component. During this method, fibrous material is disposed with a first mandrel, a second mandrel and a first mold section. The first mandrel includes a first base. The second mandrel includes a second base. The first mold section includes a support surface. The first base is arranged on the support surface. The second base is arranged on the support surface adjacent a first side of the first base. This arranging includes moving the second base along a first trajectory that is substantially coincident with a corner between the first side of the first base and the support surface. A second mold section is arranged with the first mold section to provide a mold. The first mandrel and the second mandrel are between the first and the second mold sections. Resin is injected into the mold to engage the fibrous material. The resin is cured to form the fiber-reinforced composite component.

According to another aspect of the present disclosure, another method is provided for manufacturing a fiber-reinforced composite component. During this method, fibrous material is disposed with a first mandrel, a second mandrel and a first mold section. The first mandrel includes a first base. The second mandrel includes a second base. The first mold section includes a horizontal support surface. The first base is arranged on the support surface. The second base is arranged on the support surface adjacent a first side of the first base. This arranging includes moving the second base along a substantially straight first trajectory that is offset from the support surface by a first acute angle. A second mold section is arranged with the first mold section to form a mold. The first mandrel and the second mandrel are between the first and the second mold sections. Resin is injected into the mold to engage the fibrous material. The resin is cured to form the fiber-reinforced composite component.

According to still another aspect of the present disclosure, another method is provided for manufacturing a fiber-reinforced composite component. During this method, prepreg material is disposed with a first mandrel, a second mandrel and a mold base. The first mandrel includes a first base. The second mandrel includes a second base. The mold base includes a horizontal support surface. The first base is arranged on the support surface. The second base is arranged on the support surface adjacent a first side of the first base. This arranging includes moving the second base along a first trajectory to the support surface using a set of guides that are offset from the support surface by an acute angle. The guides translatably connect the second base with the mold base. A mold lid is arranged with the mold base to form a mold. The first mandrel and the second mandrel are between the mold base and the mold lid. Resin is injected into the mold to engage the fibrous material. The resin is cured to form the fiber-reinforced composite component.

According to still another aspect of the present disclosure, another method is provided for manufacturing a fiber-reinforced composite component. This method includes: (a) disposing fibrous material with a first mandrel, a second mandrel and a first mold section; (b) arranging the first mandrel with the first mold section; (c) arranging the second mandrel with the first mold section such that the fibrous material disposed with the second mandrel substantially simultaneously contacts the fibrous material disposed with the first mandrel and the first mold section; (d) arranging a second mold section with the first mold section to form a mold, wherein the first mandrel and the second mandrel are between the first and the second mold sections; (e) injecting resin into the mold to engage the fibrous material; and (f) curing the resin to form the fiber-reinforced composite component.

The arranging of the second mandrel may include moving the second mandrel along a first trajectory that is substantially coincident with a corner between the first mandrel and the first mold section.

The arranging of the first mandrel may include moving the first mandrel along a second trajectory to the first mold section. The second trajectory may be non-parallel (or parallel) with the first trajectory.

The method may include: (i) disposing fibrous material with a third mandrel; and (ii) arranging the third mandrel with the first mold section such that the fibrous material disposed with the third mandrel substantially simultaneously contacts the fibrous material disposed with the second mandrel and the first mold section. The third mandrel may also be between the first and the second mold sections.

The method may include using one or more guide pins during the arranging of the second mandrel with the first mold section. In addition or alternatively, the method may include arranging the second mandrel with a mandrel handling fixture. The mandrel handling fixture may be configured to rotate the second mandrel along an axis, change a vertical position of the second mandrel relative to the mandrel handling fixture, and/or translate the second base along the first trajectory. The fibrous material may be disposed with the second mandrel while the second mandrel is arranged with the mandrel handling fixture. The second mandrel may be arranged with the first mold section using the mandrel handling fixture.

The first trajectory may be offset from the surface by an acute angle.

The acute angle may be a first acute angle. The arranging of the first base may include moving the first base along a second trajectory that is offset from the support surface by a second acute angle.

The first acute angle may be substantially equal to the second acute angle.

The arranging of the first base may include moving the first base along a second trajectory that is offset from the support surface by a right angle.

The method may include a step of arranging a third base of a third mandrel on the support surface adjacent a second side of the first base. This arranging may include moving the third base along a second trajectory that is substantially coincident with a corner between the second side of the first base and the support surface. The second side may be opposed to the first side. The disposing may include disposing the fibrous material with the third mandrel. The third mandrel may be between the first and the second mold sections.

The first trajectory may be offset from the support surface by a first acute angle. The second trajectory may be offset from the support surface by a second acute angle.

The first acute angle may be substantially equal to the second acute angle.

The second base may be moved along the first trajectory using a guide that translatably connects the second base with the first mold section.

The guide may be configured as or otherwise include a guide pin.

The guide may be secured to the second base. The guide may be mated with an aperture in the first mold section. The moving the second base along the first trajectory may include sliding the guide within the aperture.

The guide may be secured to the first mold section. The guide may be mated with an aperture in the second base. The moving the second base along the first trajectory may include sliding the guide within the aperture.

The guide may be one of a plurality of guides that translatably connect the second base with the first mold section. The guides may be used in the moving of the second base along the first trajectory.

The method may include a step of removing the guide before the second mold section is arranged with the first mold section.

The method may include a step of arranging the second mandrel with a mandrel handling fixture. The mandrel handling fixture may be configured to rotate the second mandrel along an axis, change a vertical position of the second mandrel relative to the mandrel handling fixture, and translate the second base along the first trajectory. The fibrous material may be disposed with the second mandrel while the second mandrel is arranged with the mandrel handling fixture. The second base may be moved along the first trajectory using the mandrel handling fixture.

At least some of the fibrous material may be configured as or otherwise include prepreg material.

The fiber-reinforced composite component may be configured as a component of an aircraft.

The method may include subjecting a composite material system to an elevated pressure and an elevated temperature during the curing. The composite material system may include the resin and the fibrous material.

The foregoing features and the operation of the invention will become more apparent in light of the following description and the accompanying drawings.

DETAILED DESCRIPTION OF THE INVENTION

Figure 1:
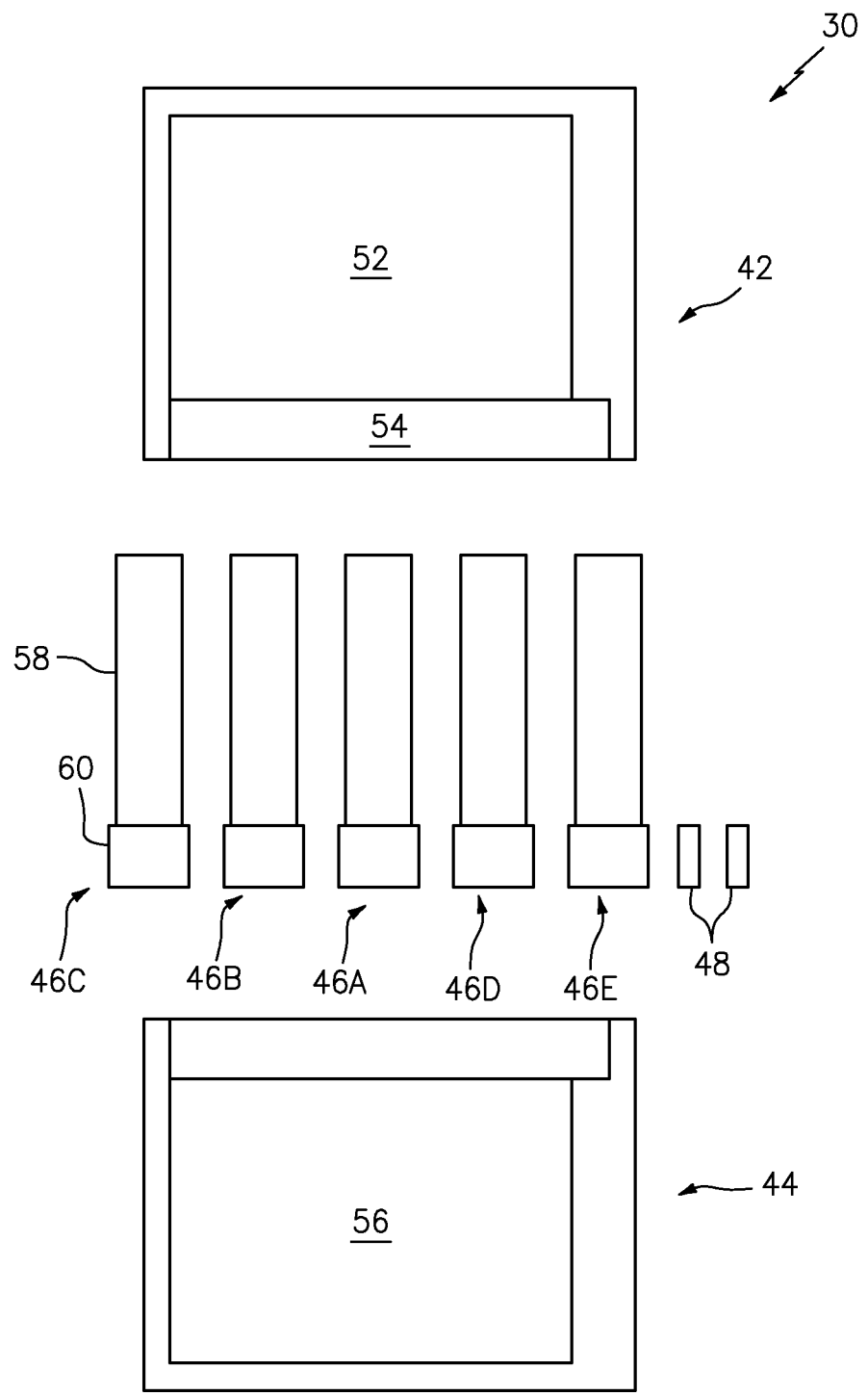
FIG. 1 is a schematic illustration of an assembly for molding a fiber-reinforced composite component.
Figure 2:
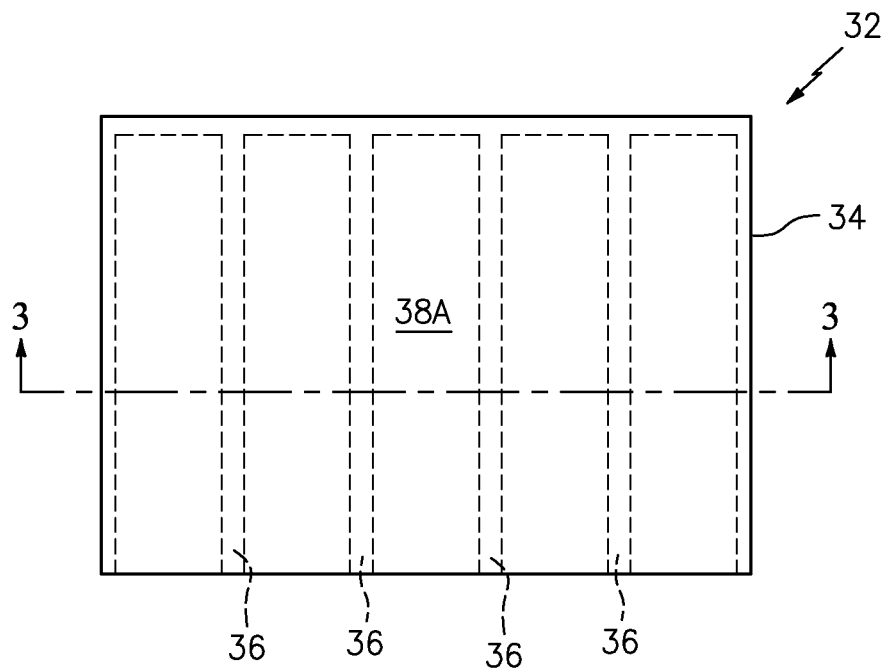
FIG. 2 is a schematic illustration of the composite component.
Figure 3:
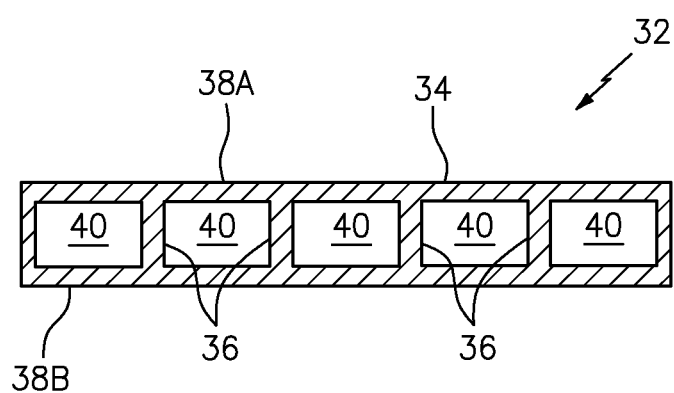
FIG. 3 is a schematic cross-sectional illustration of the composite component of FIG. 2.

FIG. 1 illustrates an assembly 30 for molding a fiber-reinforced composite component. An exemplary representation of such a molded composite component 32 is shown in FIGS. 2 and 3. This composite component 32 may be configured as a rear stabilator or stabilizer for an aircraft, as one example. The composite component 32 could also be any other composite, co-cured component with internal support structures such as ribs or spars.

The composite component 32 of FIGS. 2 and 3 includes an outer shell 34 (or wall) and one or more internal spars 36. These spars 36 are arranged within an interior of the outer shell 34. Each of the spars 36 extends between and is connected to skins or sidewall portions 38A and 38B (generally referred to as "38") of the outer shell 34, thereby providing an internal support structure for the sidewall portions 38. With this arrangement, the spars 36 form a plurality of cavities/passages 40 within the outer shell 34.

Referring again to FIG. 1, the mold assembly 30 includes a first mold section 42 (e.g., a mold base or bottom half) and a second mold section 44 (e.g., a mold lid or top half). The mold assembly 30 also includes a set of mandrels 46A-E (generally referred to as "46"), which are used to form the cavities 40 within the composite component 32. One or more drive blocks 48 (or spacer blocks) may also be included to position the mandrels 46 relative to the mold sections.

Figure 4:
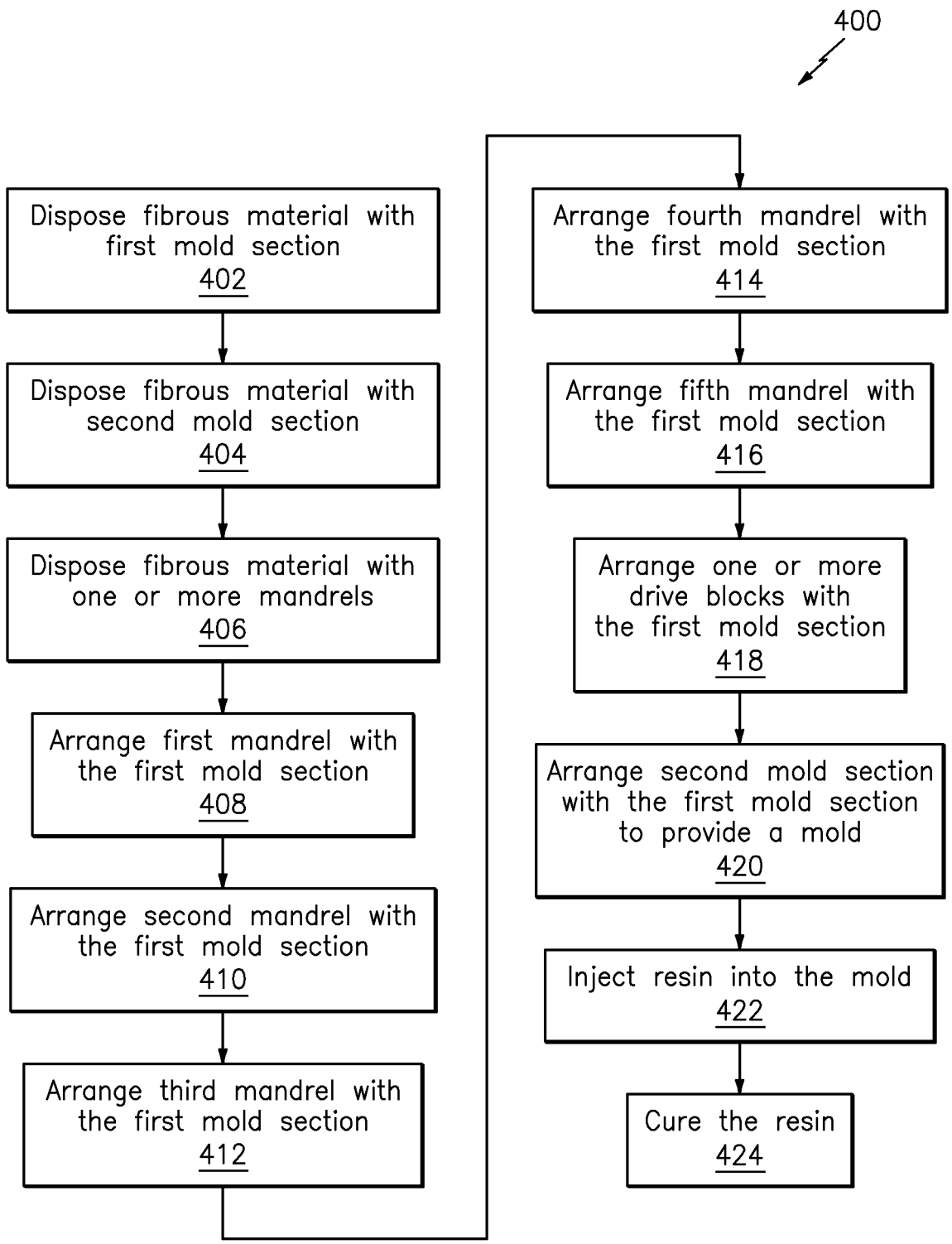
FIG. 4 is a process diagram of a method for manufacturing a fiber-reinforced composite component.

FIG. 4 is a process diagram of a method 400 for manufacturing a fiber-reinforced composite component such as the composite component 32 of FIGS. 2 and 3. This method 400 may be performed using a mold assembly such as the mold assembly 30 of FIG. 1. The method 400, of course, is not limited to manufacturing any particular types of composite components. The method 400 is also not limited to using the specific mold assembly 30 configurations described herein.

Figure 5:
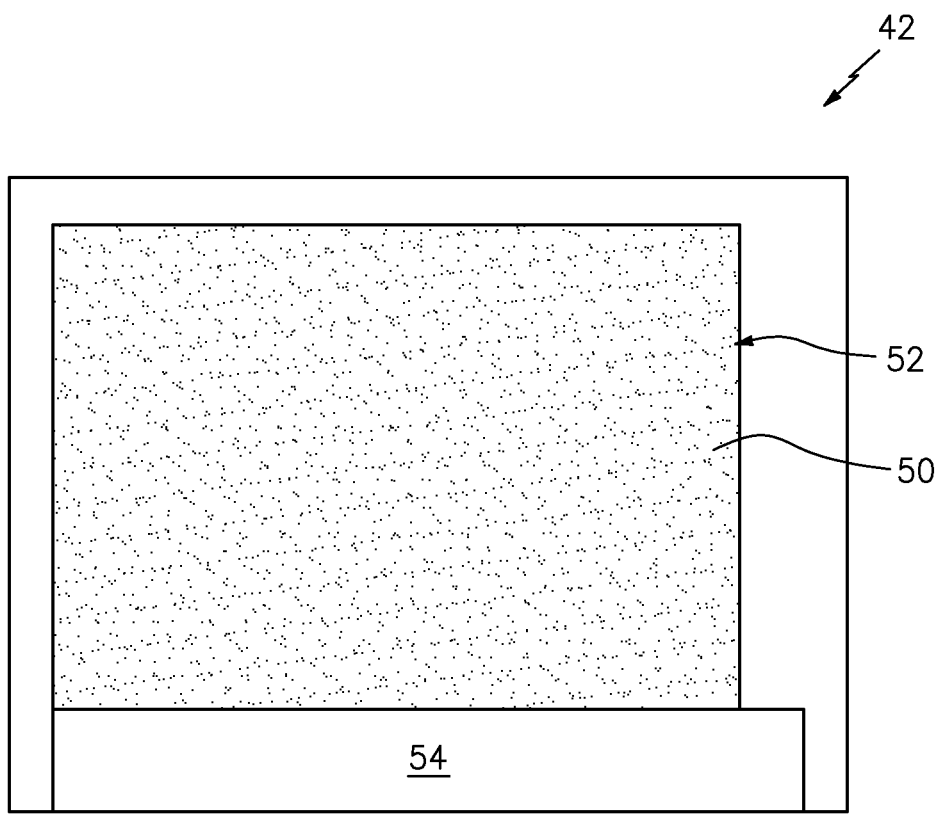
FIG. 5 is a schematic illustration of a first mold section configured with fibrous material.
Figure 6:
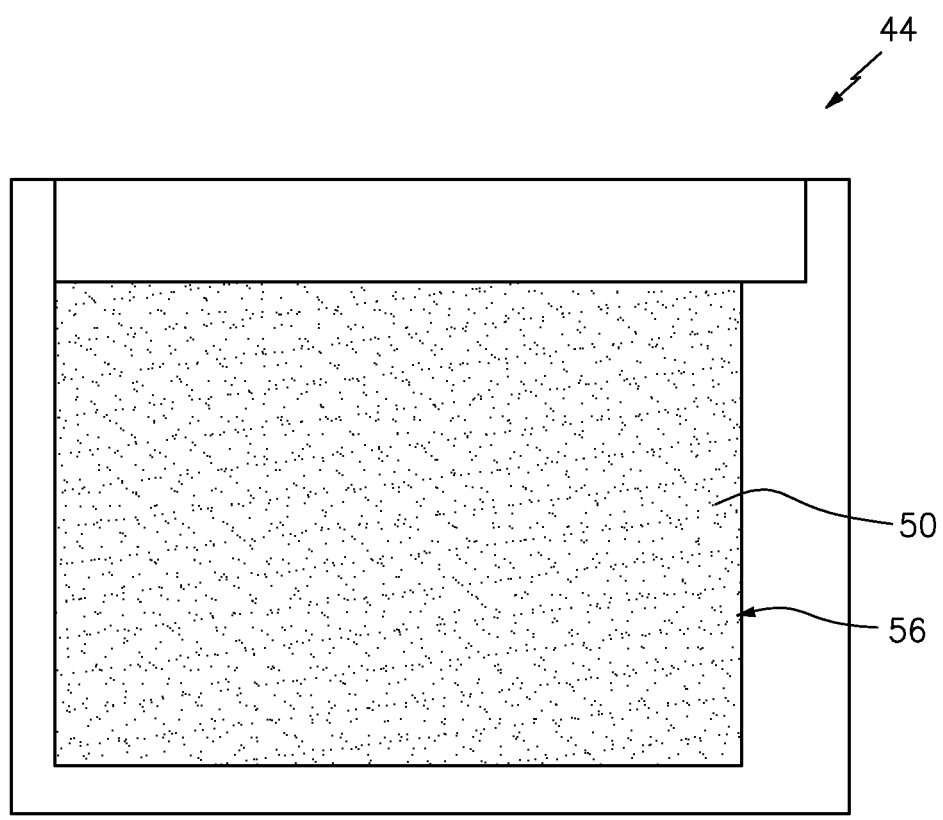
FIG. 6 is a schematic illustration of a second mold section configured with fibrous material.
Figure 7:
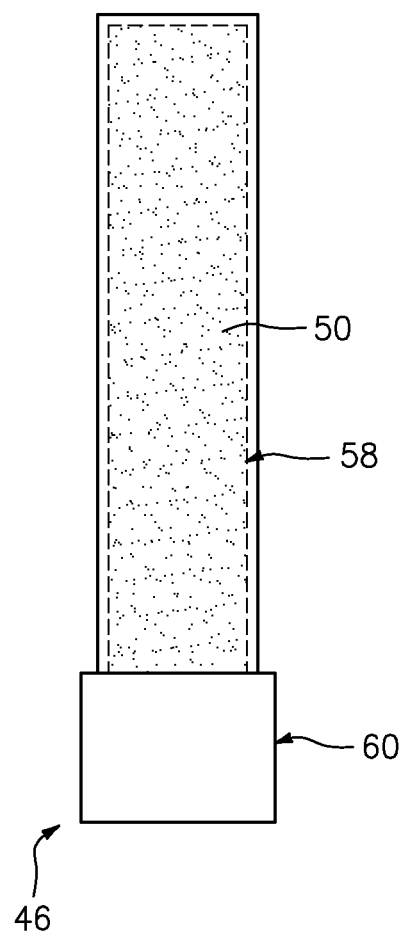
FIG. 7 is a schematic illustration of a mandrel configured with fibrous material.

The method 400 utilizes at least fibrous materials 50 (see FIGS. 5-7) and resin to form the composite component 32. Examples of suitable fibrous materials 50 include, but are not limited to, carbon fiber, fiber glass, aramid fiber (e.g., Kevlar® fiber) as well as composites including one or more of the foregoing types of fibers. The fibrous materials 50 may be in the form of sheets of fibrous material; e.g., woven sheets of fibrous materials, fiber mat, etc. The fibrous materials 50 may also be impregnated with uncured or partially cured resin. Such resin impregnated fibrous material may be referred to as "prepreg" material. The present disclosure, however, is not limited to the foregoing exemplary types and forms of fibrous materials. Furthermore, in some embodiments, additional materials such as chopped fibers may also be used.

In step 402, fibrous material 50 is disposed with the first mold section 42. For example, referring to FIG. 5, the fibrous material 50 may be laid up within a recess 52 of the first mold section 42, which recess 52 may be adjacent to a (e.g., horizontal) support surface 54 of the first mold section 42.

In step 404, fibrous material 50 is disposed with the second mold section 44. For example, referring to FIG. 6, the fibrous material 50 may be laid up (e.g., disposed) within a recess 56 of the second mold section 44; e.g., disposed in stacked layers of material.

In step 406, fibrous material 50 is disposed on and/or around each of the mandrels 46. For example, referring to FIG. 7, the fibrous material 50 may be laid up with and wrap (e.g., multiple times) around a molding portion 58 of each mandrel 46, which molding portions 58 projects out from a base 60 of that mandrel 46.

Figure 8:
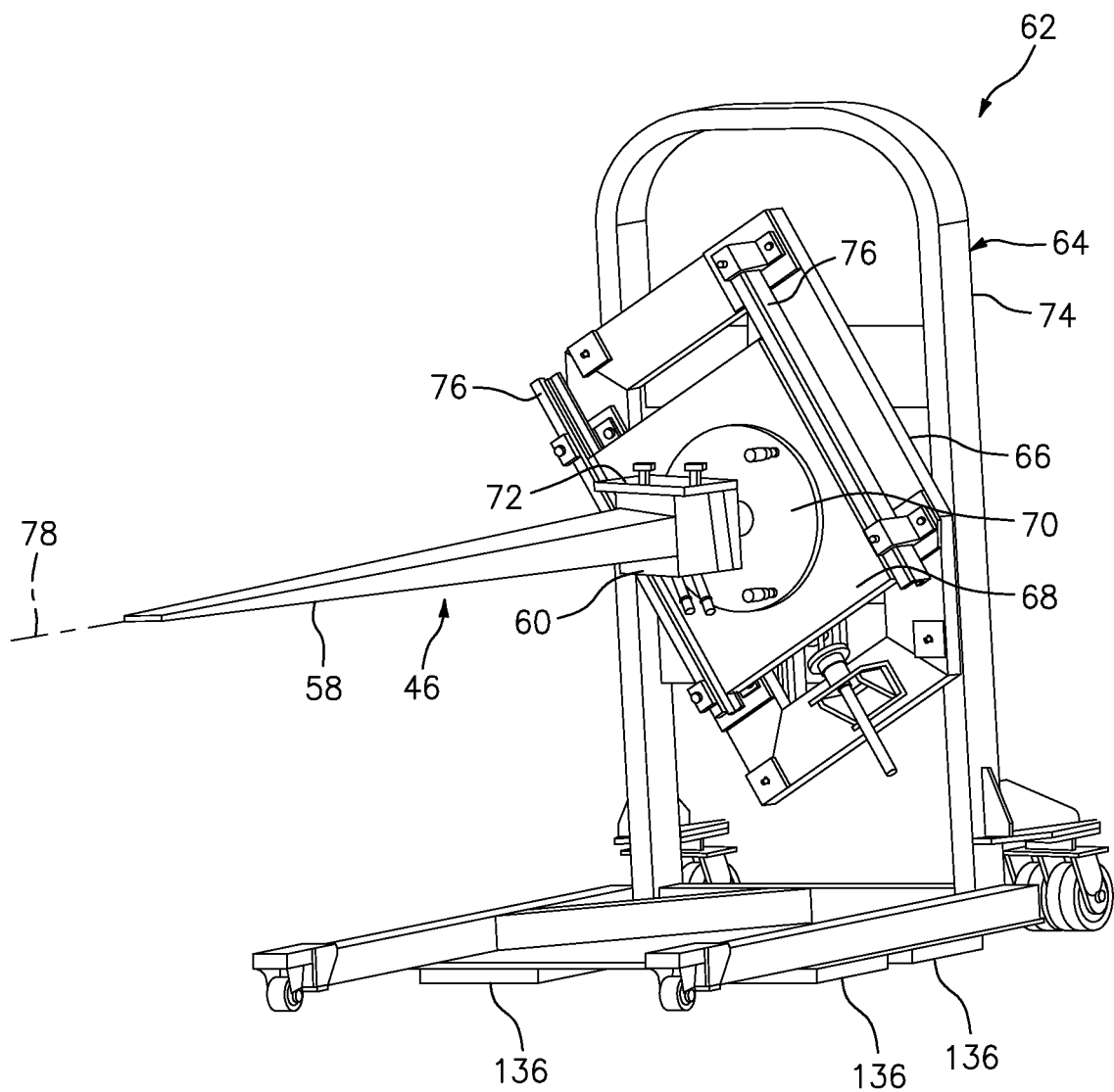
FIG. 8 is a perspective illustration of a mandrel handling fixture with a mandrel mounted therewith.

To facilitate the step 406, each of the mandrels 46 may be arranged with a mandrel handling fixture. An exemplary embodiment of such a mandrel handling fixture 62 with a mandrel 46 (e.g., 46B) arranged therewith is shown in FIG. 8. This mandrel handling fixture 62 includes a base structure 64, a first carriage 66, a second carriage 68, a turntable 70 and a mandrel mount 72, which mount 72 is attached to the turntable 70 and configured to mount the respective mandrel 46 to the fixture 62.

The first carriage 66 is oriented (e.g., stands) generally vertically from an upright portion 74 of the base structure 64. This first carriage 66 may be mounted to the upright portion 74 of the base structure 64 via one or more guides, thereby enabling the first carriage 66 to move vertically up and down so as to adjust the vertical position of the mandrel 46.

The second carriage 68 is oriented (e.g., stands) generally vertically from the first carriage 66. This second carriage 68 may be mounted to the first carriage 66 via one or more guides 76 (e.g., tracks), thereby enabling the second carriage 68 to move along the guides 76 to further adjust the position of the mandrel 46. These guides 76 may extend diagonally (e.g., vertically and horizontally) as shown in FIG. 8. Alternatively, the guides 76 may extend substantially vertically. The specific orientation of the guides 76 will depend on how the corresponding mandrel 46 is to be arranged with the first mold section 42 as described below in further detail.

The turntable 70 is oriented (e.g., stands) generally vertically from the second carriage 68 such that a rotational axis 78 of the turntable 70 and, thus, a longitudinal axis of the corresponding mandrel 46 is substantially horizontal. The turntable 70 is configured to rotate the mandrel 46 about the rotational axis 78, which may be useful while wrapping the fibrous material 50 around the molding portion 58.

In step 408, the first mandrel 46A is arranged (e.g., assembled) with the first mold section 42. For example, referring to FIG. 9, the first mandrel 46A is located proximate the first mold section 42. The base 60 of the first mandrel 46A is aligned with and positioned over the support surface 54. The molding portion 58 of the first mandrel 46A is aligned with and positioned over the recess 52 of the first mold section 42 and the laid up fibrous material 50 therein (e.g., see FIG. 18).

Figure 9:
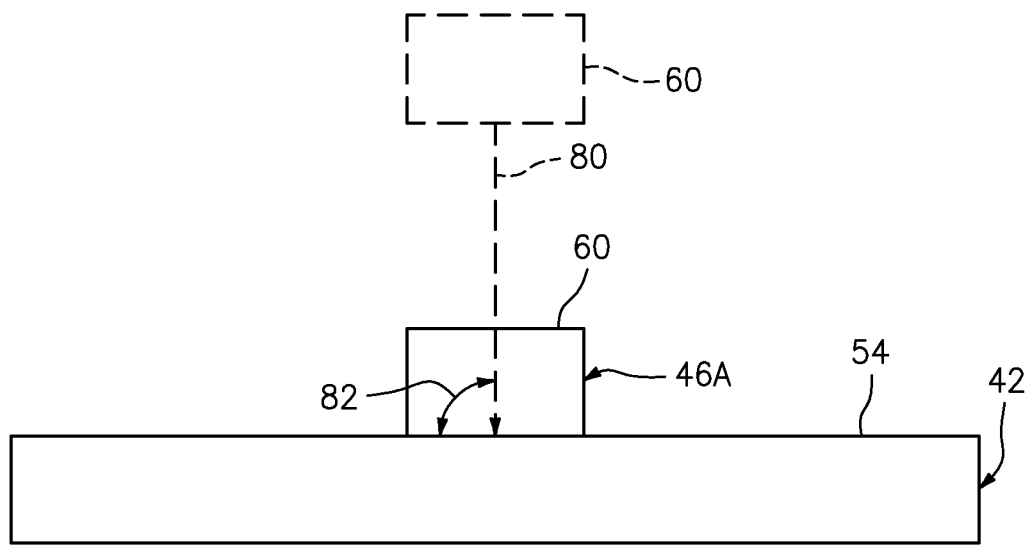
FIG. 9 is a schematic illustration of a mandrel being arranged with the first mold section.

The positioned first mandrel 46A of FIG. 9 is lowered onto the first mold section 42. As the first mandrel 46A is lowered, its base 60 moves along a trajectory 80 until the base 60 is on and supported by the support surface 54. This trajectory 80 may be substantially perpendicular to the support surface 54; i.e., the trajectory 80 may be offset from the support surface 54 by a substantially right (ninety degree) angle 82. However, in other embodiments, the trajectory 80 may be offset from the support surface 54 by an acute angle as described below with respect to the other mandrels 46B-E.

To aid in the arrangement of the first mandrel 46A, the first mandrel 46A may be lowered onto the support surface 54 using its respective mandrel handling fixture 62 (e.g., see FIG. 8). The first carriage 66, for example, may be lowered to provide gross (or large scale) vertical adjustment. The second carriage 68 may then be lowered to provide fine (or small scale) vertical adjustment. The second carriage 68 may also be specifically configured to lower the first mandrel 46A along the trajectory 80.

Figure 10:
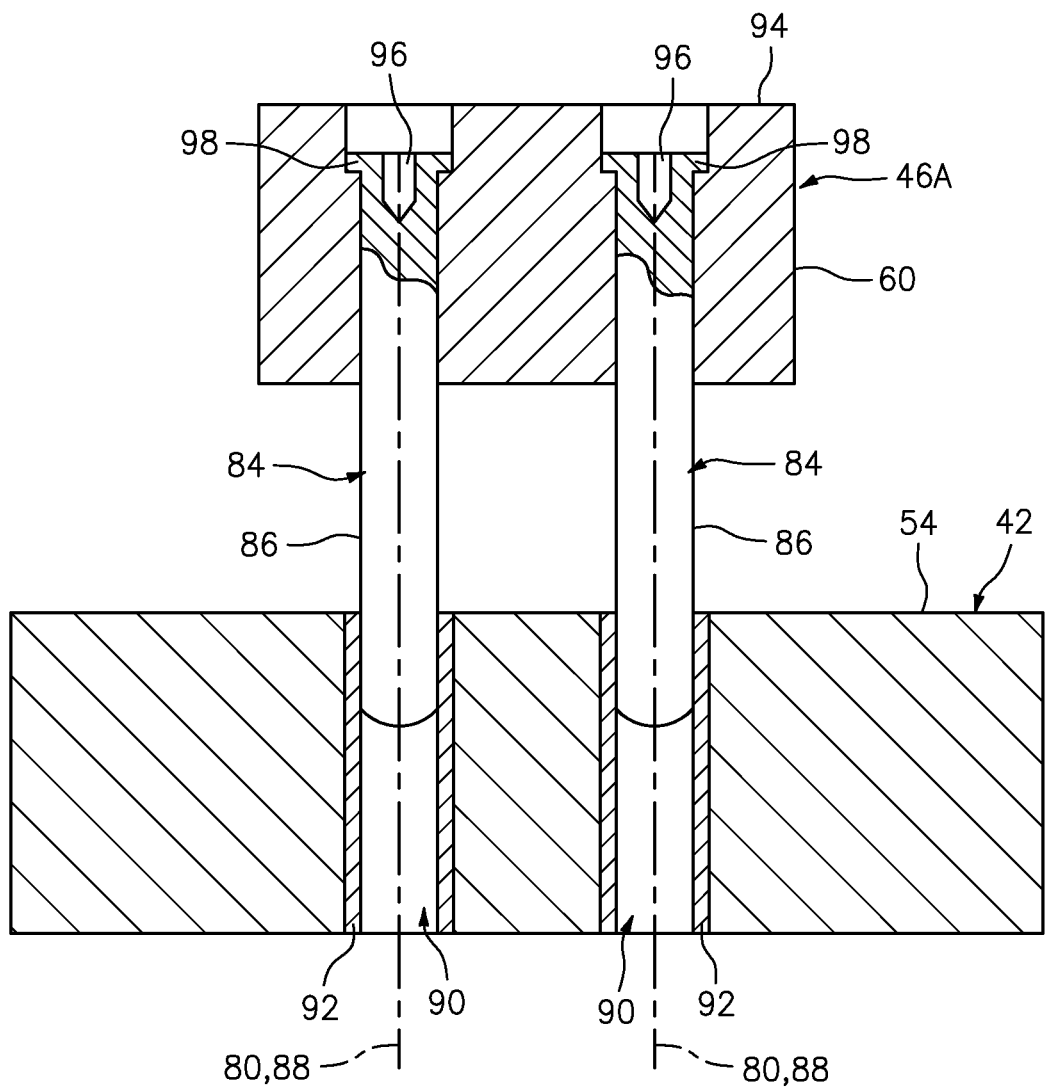
FIG. 10 is a cutaway illustration of the mandrel of FIG. 9 translatably connected to the first mold section.

Referring now to FIG. 10, one or more guides 84 may also or alternatively be used to guide the base 60 of the first mandrel 46A along the trajectory 80. These guides 84 may be configured as guide pins, which translatably connect the base 60 of the first mandrel 46A to the first mold section 42. Each of the guides 84 of FIG. 10, for example, are removably mounted with the base 60 of the first mandrel 46A such that end portions 86 thereof project down from the base 60 along axes 88 that are parallel with the trajectory 80. These end portions 86 are respectively mated with apertures 90 in the first mold section 42, which apertures 90 may be respectively lined by bushings 92. More particularly, the end portions 86 project down into the apertures 90 and the bushings 92. The mated end portions 86 thereafter may slide within the apertures 90 along the axes 88 and thereby guide the base 60 of the first mandrel 46A along the trajectory 80 as the base 60 is lowered onto the support surface 54.

Once the base 60 of the first mandrel 46A is arranged on the support surface 54 (e.g., see FIG. 9), the guides 84 may be removed. Where the guides 84, for example, are secured to the base 60 of the first mandrel 46A via an interference fit, each guide 84 may be removed from a top side 94 of the base 60 using a slide hammer. More particularly, a shaft of the slide hammer may be threaded into an aperture 96 in a head portion 98 of each guide 84.

Figure 12:
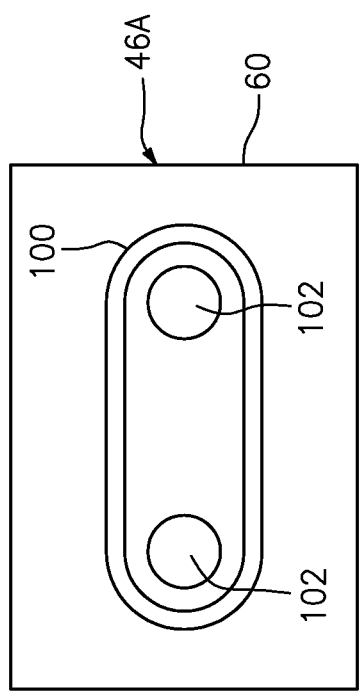
FIG. 12 is a sectional illustration of the assembly of FIG. 11.
Figure 11:
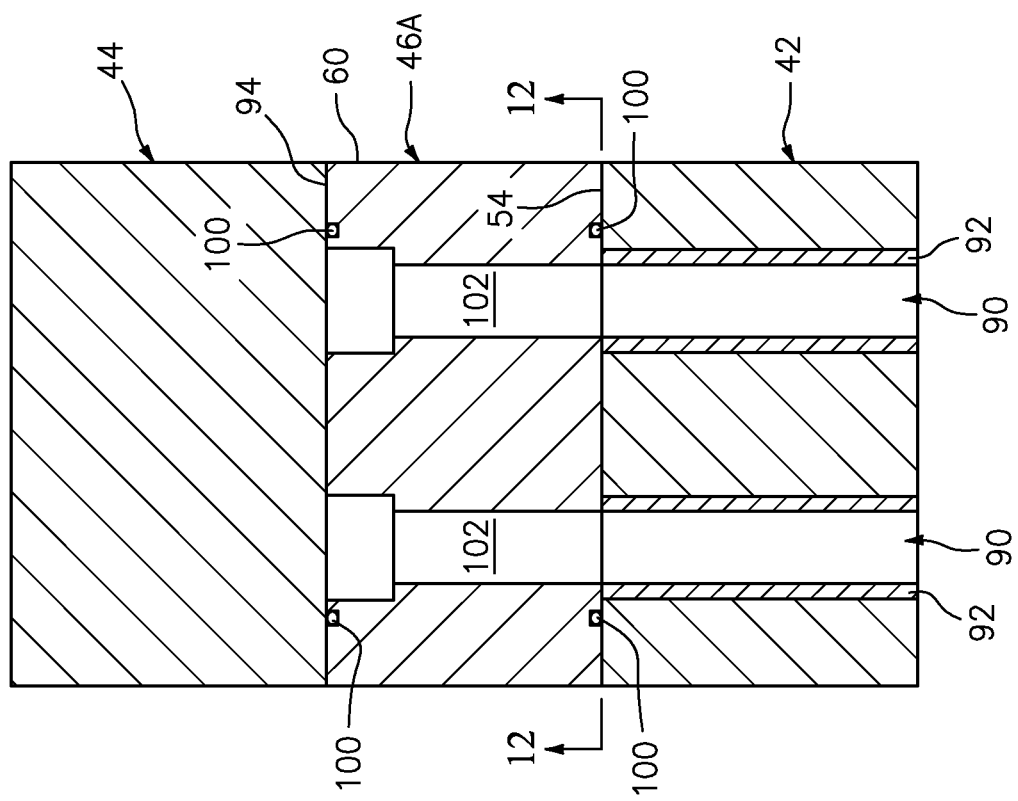
FIG. 11 is a partial illustration of the mandrel of FIG. 9 between the first and the second mold sections.

After removal of the guides 84, O-rings 100 and/or other seal devices may be used to seal of the apertures 90 in the first mold section 42 and the apertures 102 in the base 60 of the first mandrel 46A. An exemplary arrangement of such O-rings is shown in FIGS. 11 and 12.

In step 410, the second mandrel 46B is arranged with the first mold section 42. For example, referring to FIG. 13, the second mandrel 46B is positioned proximate the first mold section 42. The base 60 of the second mandrel 46B is aligned with and positioned over the support surface 54. The molding portion 58 of the second mandrel 46B is aligned with and positioned over the recess 52 of the first mold section 42 and the laid up fibrous material 50 therein (e.g., see FIG. 18).

Figure 13:
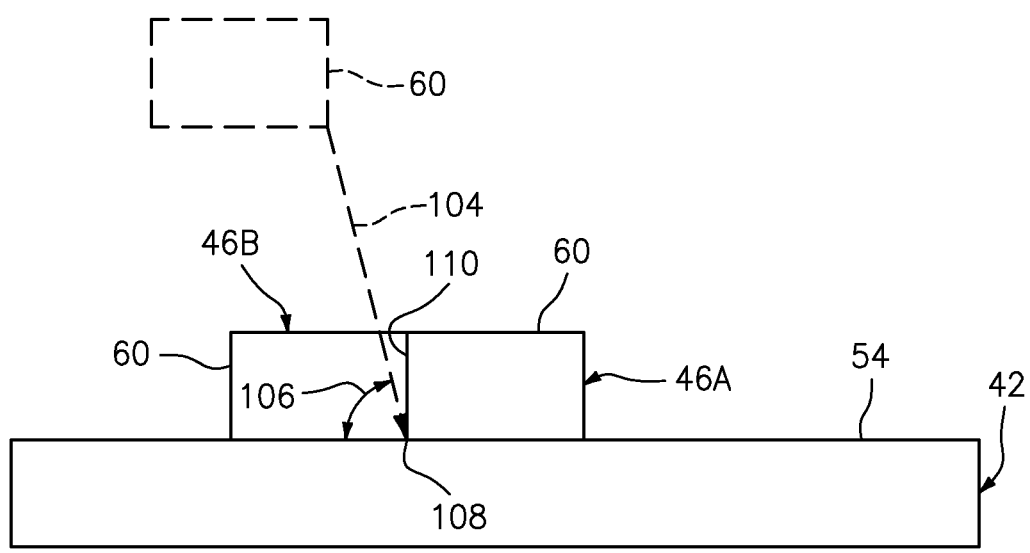
FIG. 13 is a schematic illustration of another mandrel being arranged with the first mold section.

The positioned second mandrel 46B of FIG. 13 is lowered onto the first mold section 42. As the second mandrel 46B is lowered, its base 60 moves along a trajectory 104 until the base 60 is on and supported by the support surface 54. This trajectory 104 is offset from the support surface 54 by an include angle 106. This angle 106 is an acute angle such as, but not limited to, an angle between about 15 and about 45 degrees, between about 65 and about 85 degrees, etc. The trajectory 104 may also be substantially coincident with a corner 108 between a first side 110 of the base 60 of the first mandrel 46A and the support surface 54. In this manner, after the second mandrel 46B is mated with the first mold section 42, the base 60 of the second mandrel 46B is on the support surface 54 and adjacent the first side 110 of the first mandrel base 60. Because the second mandrel 46B is moved along the trajectory 104, there may be little or no risk of the fibrous material 50 on the second mandrel 46B rubbing against the fibrous material 50 on the first mandrel 46A. Note, such rubbing may damage and/or otherwise disrupt the fibrous material 50 and cause defects in the composite component 32 after molding. Generally speaking, the idea is for all composite covered surfaces of the mandrel to touch composite covered surfaces of the die at the same time; e.g., no contact first followed by a rubbing translation of any of the composite covered surfaces.

To aid in the arrangement of the second mandrel 46B, the second mandrel 46B may be lowered onto the support surface 54 using its respective mandrel handling fixture 62 (e.g., see FIG. 8). The first carriage 66, for example, may be lowered to provide gross (or large scale) vertical adjustment. The second carriage 68 may then be lowered to provide fine (or small scale) vertical adjustment. The second carriage 68 may also be specifically configured to lower the second mandrel 46B along the trajectory 104.

Figure 14:
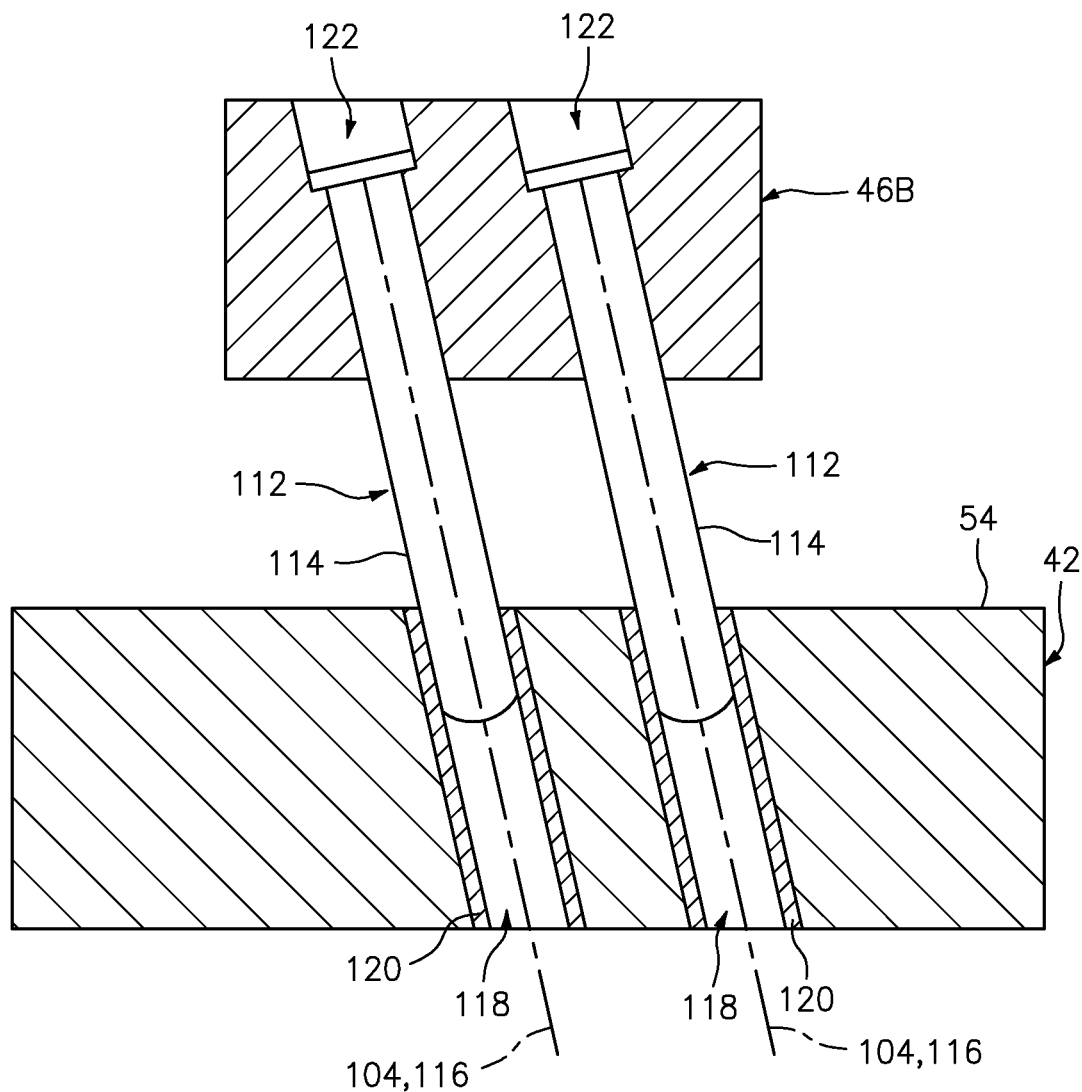
FIG. 14 is a cutaway illustration of the mandrel of FIG. 13 translatably connected to the first mold section.

Referring now to FIG. 14, one or more guides 112 may also or alternatively be used to guide the base 60 of the second mandrel 46B along the trajectory 104. These guides 112 may be configured as guide pins, which translatably connect the base 60 of the second mandrel 46B to the first mold section 42. Each of the guides 112 of FIG. 14, for example, are removably mounted with the base 60 of the second mandrel 46B such that end portions 114 thereof project down from the base 60 along axes 116 that are parallel with the trajectory 104. These end portions 114 are respectively mated with apertures 118 in the first mold section 42, which apertures 118 may be respectively lined by bushings 120. More particularly, the end portions 114 project down into the apertures 118 and the bushings 120. The mated end portions 114 thereafter may slide within the apertures 118 along the axes 116 and thereby guide the base 60 of the second mandrel 46B along the trajectory 104 as the base 60 is lowered onto the support surface 54.

Once the base 60 of the second mandrel 46B is arranged on the support surface 54 (e.g., see FIG. 13), the guides 112 may be removed as described above in the step 408. After removal of the guides 112, O-rings and/or other seal devices may be used to seal of the apertures 122 in the first mold section 42 and the apertures 118 in the base 60 of the second mandrel 46B.

Figure 15:
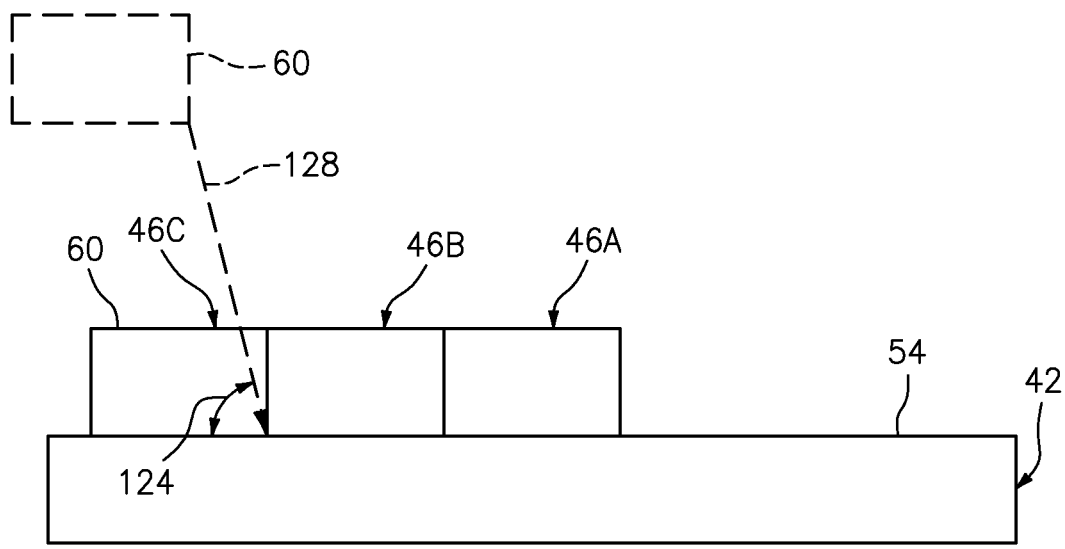
FIGS. 15-17 are schematic illustrations of mandrels being arranged with the first mold section.
Figure 16:
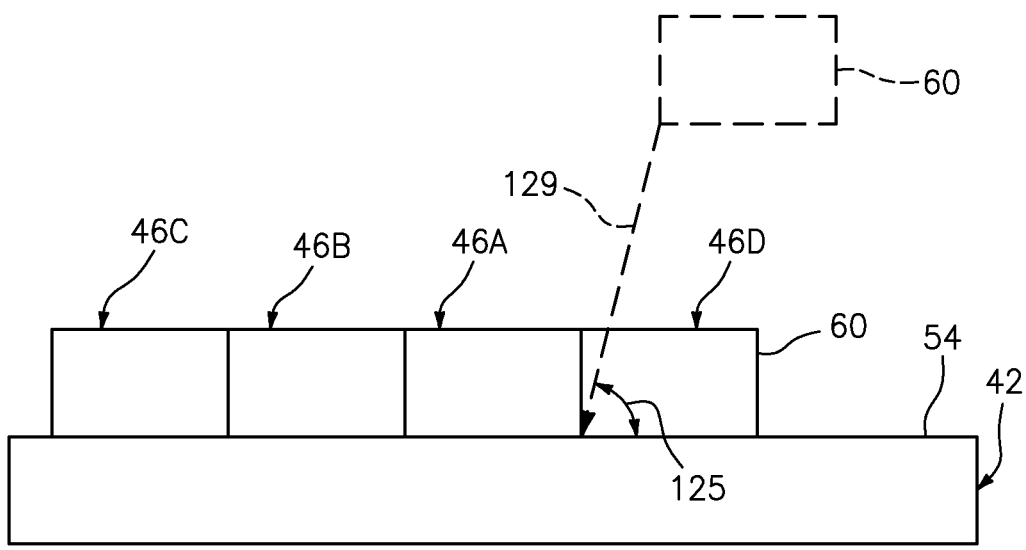
Figure 17:
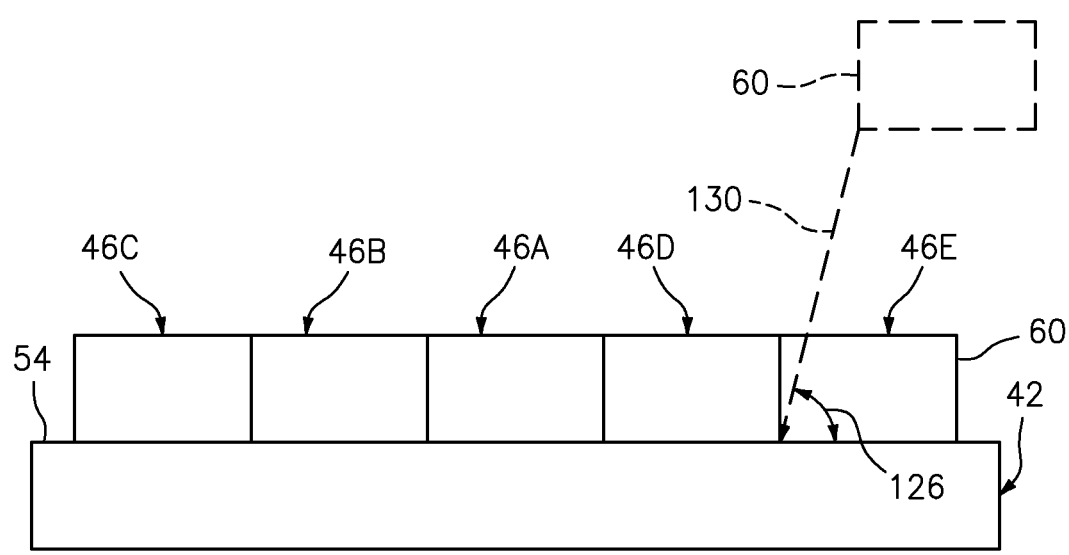

In steps 412, 414 and 416, the remaining mandrels 46C-E are arranged with the first mold section 42 as shown in FIGS. 15-17. One or more of these mandrels 46C-E may be arranged using similar techniques as described above with respect to the second mandrel 46B and the step 410. While included acute angles 124-126 between trajectories 128-130 of the mandrels 46C-E are shown as being substantially equal to the offset angle 106 of FIG. 13, one or more of these angles 124-126 may alternatively be different (e.g., smaller or larger) than the angle 106.

Figure 18:
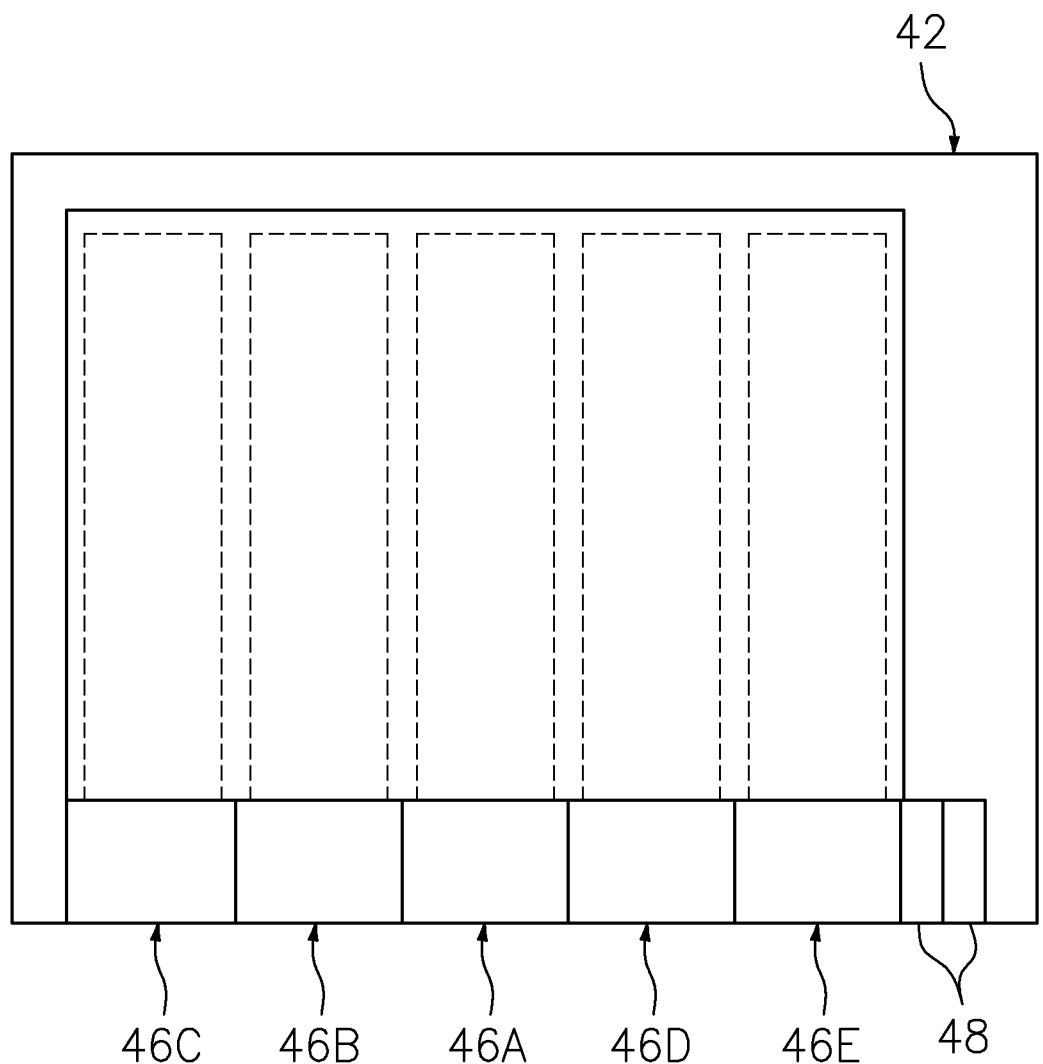
FIG. 18 is a schematic illustration of the mandrels and drive blocks assembled with the first mold section.

In step 418, the drive blocks 48 are arranged with the first mold section 42 as shown in FIG. 18. In particular, the drive blocks 48 may be disposed on the support surface 54 adjacent the base 60 of the fifth mandrel 46E (or alternatively the base 60 of the third mandrel 46C). These drive blocks 48 are configured to press the bases 60 of the mandrels 46 together during molding to ensure proper mandrel 46 positioning.

Figure 19:
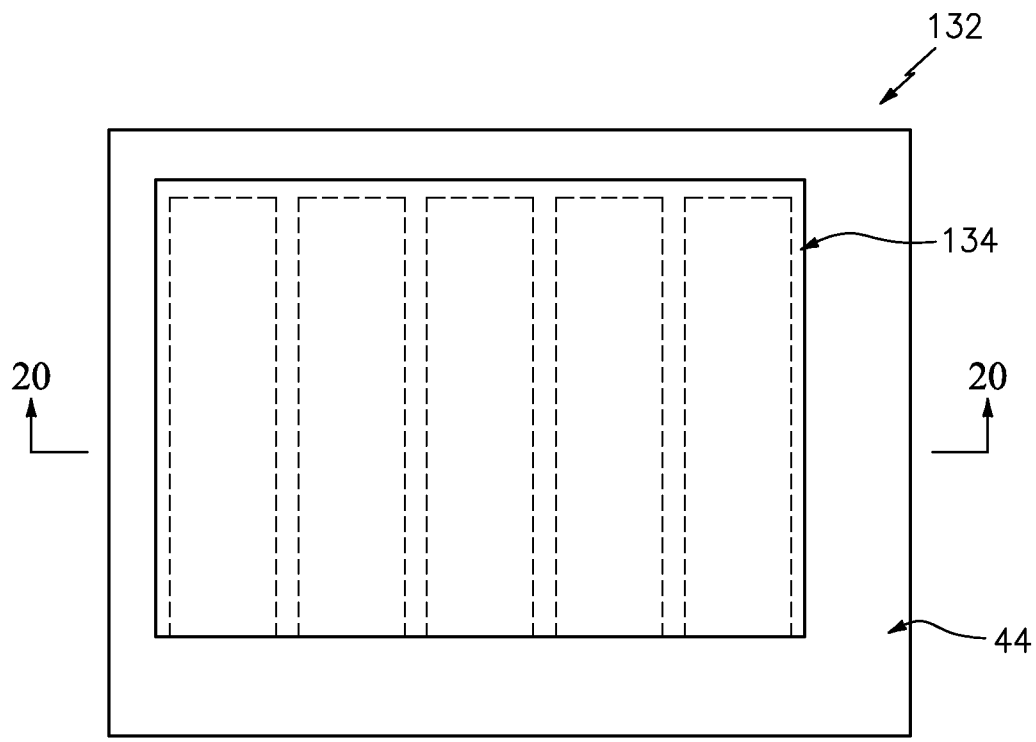
FIG. 19 is a schematic illustration of a mold formed from the components of the assembly of FIG. 1.
Figure 20:
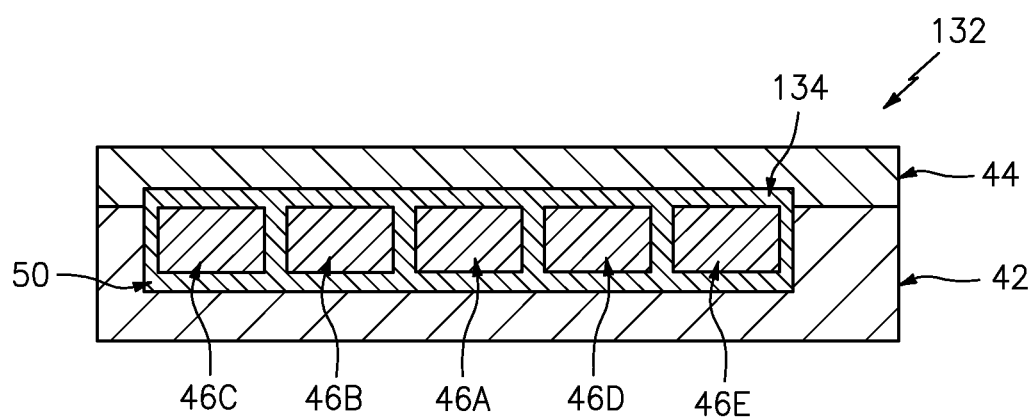
FIG. 20 is a schematic cross-sectional illustration of the mold of FIG. 19.

In step 420, the second mold section 44 is arranged with the first mold section 42 to form a mold 132 as shown in FIGS. 19 and 20. With this configurations, the recesses 52 and 56 (see FIGS. 5 and 6) of the first mold section 42 and the second mold section 44 form an internal cavity 134 in which the composite component 32 is to be formed.

In step 422, resin is injected into the internal cavity 134 of the mold 132. The resin is injected into any cavities not filled by the composite layup and around the edges of the composite layup, and serves to maintain hydrostatic pressure inside of the mold and around the part to avoid any resin flow out of the prepreg during curing. This resin injection step 422 may be performed while the mold 132 is subject to a vacuum and/or elevated pressure.

In step 424, the resin in the composite material system is cured under elevated temperature (e.g., about 350 degrees Fahrenheit/177 degrees Celsius) and elevated pressure to form the composite component 32. In step 426, the mold assembly 30 is disassembled to reveal the composite component 32 of FIGS. 2 and 3.

The present disclosure is not limited to the specific steps and/or the order of the steps outlined above with respect to the method 400. In particular, the method 400 may be modified to include one or more additional steps, omit one or more of the foregoing steps and/or replace one or more of its steps with another step. For example, in some embodiments, in addition to or in alternative to the step 404, fibrous material 50 may be disposed over the mandrels 46 after those mandrels 46 are arranged with the first mold section 42. The second mold section 44 (with or without its laid up fibrous material 50) may then be mated with the first mold section 42 to form the mold 132. In some embodiments, one of the other mandrels 46B-D may be the first mandrel arranged with the first mold section.

In some embodiments, one or more of the guides 84, 112 may be removably secured with the first mold section 42 rather than with the respective mandrel(s) 46. With such a configuration, corresponding apertures and bushings would be arranged with the base(s) 60 of the mandrel(s) 46.

Referring to FIG. 8, in some embodiments, each mandrel handling fixture 62 may include one or more air bearings 136. These air bearings 136 may enable easier and/or more precise movement of the respective mandrel 46 on a shop floor relative to the first mold section 42.

In some embodiments, one or more of the mandrels may be configured without a base. Thus, the entire mandrel may be wrapped with fibrous material and laid within the mold.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

I claim:

1. A method for manufacturing a fiber-reinforced composite component, comprising:
   disposing fibrous material with a first mandrel, a second mandrel and a first mold section, the first mandrel including a first base, the second mandrel including a second base, and the first mold section including a support surface;
   arranging the first base on the support surface;
   arranging the second base on the support surface adjacent a first side of the first base, the arranging the second base comprising moving the second base along a first trajectory that is substantially coincident with a corner between the first side of the first base and the support surface, wherein the second base is moved along the first trajectory using a guide that translatably connects the second base with the first mold section, and wherein the guide is secured to the second base by an interference fit between the guide and the second base;
   removing the guide from the second base and the first mold section;
   arranging a second mold section with the first mold section to provide a mold after the guide is removed, wherein the first mandrel and the second mandrel are between the first and the second mold sections;
   injecting resin into the mold to engage the fibrous material; and
   curing the resin to form the fiber-reinforced composite component.

2. The method of claim 1, wherein the first trajectory is offset from the support surface by an acute angle.

3. The method of claim 2, wherein the acute angle is a first acute angle, and the arranging of the first base comprises moving the first base along a second trajectory that is offset from the support surface by a second acute angle.

4. The method of claim 3, wherein the first acute angle is substantially equal to the second acute angle.

5. The method of claim 2, wherein the arranging of the first base comprises moving the first base along a second trajectory that is offset from the support surface by a right angle.

6. The method of claim 1, further comprising:
   arranging a third base of a third mandrel on the support surface adjacent a second side of the first base, the arranging comprising moving the third base along a second trajectory that is substantially coincident with a corner between the second side of the first base and the support surface;
   wherein the second side is opposed to the first side, the disposing comprises disposing the fibrous material with the third mandrel, and the third mandrel is between the first and the second mold sections.

7. The method of claim 6, wherein the first trajectory is offset from the support surface by a first acute angle, and the second trajectory is offset from the support surface by a second acute angle.

8. The method of claim 7, wherein the first acute angle is substantially equal to the second acute angle.

9. The method of claim 1, wherein the guide comprises a guide pin.

10. The method of claim 1, wherein the guide projects into a first aperture that extends into the second base, the guide is mated with a second aperture in the first mold section, and the moving the second base along the first trajectory comprises sliding the guide within the second aperture.

11. The method of claim 1, wherein the guide is one of a plurality of guides that translatably connect the second base with the first mold section, and the guides are used in the moving of the second base along the first trajectory.

12. The method of claim 1, further comprising:
   arranging the second mandrel with a mandrel handling fixture;
   wherein the mandrel handling fixture is configured to rotate the second mandrel along an axis, change a vertical position of the second mandrel relative to the mandrel handling fixture, and translate the second base along the first trajectory;
   wherein the fibrous material is disposed with the second mandrel while the second mandrel is arranged with the mandrel handling fixture; and
   wherein the second base is moved along the first trajectory using the mandrel handling fixture.

13. A method for manufacturing a fiber-reinforced composite component, comprising:
   disposing fibrous material with a first mandrel, a second mandrel and a first mold section;
   arranging the first mandrel with the first mold section;
   arranging the second mandrel with the first mold section such that the fibrous material disposed with the second mandrel substantially simultaneously contacts the fibrous material disposed with the first mandrel and the first mold section;
   using one or more guide pins during the arranging of the second mandrel with the first mold section, wherein the one or more guide pins are removably fixedly secured to the second mandrel, wherein a first of the one or more pins is arranged within a first aperture in the second mandrel that extends into the second mandrel from a surface of the second mandrel configured to contact the first mold section, and wherein the first of the one or more pins is configured to translate within a second aperture in the first mold section;
   arranging a second mold section with the first mold section to form a mold, wherein the first mandrel and the second mandrel are between the first and the second mold sections;

injecting resin into the mold to engage the fibrous material, wherein the one or more guide pins are removed before the resin is injected into the mold; and curing the resin to form the fiber-reinforced composite component.

14. The method of claim 13, wherein the arranging of the second mandrel comprises moving the second mandrel along a first trajectory that is substantially coincident with a corner between the first mandrel and the first mold section.

15. The method of claim 14, wherein the arranging of the first mandrel comprises moving the first mandrel along a second trajectory to the first mold section, and wherein the second trajectory is non-parallel with the first trajectory.

16. The method of claim 13, further comprising:
disposing fibrous material with a third mandrel; and
arranging the third mandrel with the first mold section such that the fibrous material disposed with the third mandrel substantially simultaneously contacts the fibrous material disposed with the second mandrel and the first mold section;
wherein the third mandrel is between the first and the second mold sections.

17. The method of claim 13, further comprising:
arranging the second mandrel with a mandrel handling fixture;
wherein the mandrel handling fixture is configured to rotate the second mandrel along an axis, change a vertical position of the second mandrel relative to the mandrel handling fixture, and translate the second base along the first trajectory;
wherein the fibrous material is disposed with the second mandrel while the second mandrel is arranged with the mandrel handling fixture; and
wherein the second mandrel is arranged with the first mold section using the mandrel handling fixture.

18. A method for manufacturing a fiber-reinforced composite component, the method comprising:
disposing fibrous material with a first mandrel, a second mandrel and a first mold section, the first mandrel including a first base, the second mandrel including a second base, and the first mold section including a support surface;
arranging the first base on the support surface;
arranging the second base on the support surface adjacent a first side of the first base, the arranging comprising moving the second base along a first trajectory that is substantially coincident with a corner between the first side of the first base and the support surface, wherein the second base is moved along the first trajectory using a guide that translatably connects the second base with the first mold section, wherein the guide projects into a first aperture in the second mandrel, wherein the guide projects downward from the second base into a second aperture in the first mold section, and wherein the guide slides within the second aperture to thereby guide the second base along the first trajectory as the second base is lowered onto the support surface;
removing the guide from the second base and the first mold section;
arranging a second mold section with the first mold section to provide a mold after the guide is removed, wherein the first mandrel and the second mandrel are between the first and the second mold sections;
injecting resin into the mold to engage the fibrous material; and
curing the resin to form the fiber-reinforced composite component.

19. The method of claim 10, wherein the first aperture extends into the second base from a surface of the second base configured to lay against the support surface.

20. The method of claim 1, wherein the removing comprises removing the guide using a slide hammer.

* * * * *